Patented Feb. 20, 1945

2,370,057

UNITED STATES PATENT OFFICE 2,370,057

FINISHING AND DRESSING AGENTS FOR FIBROUS MATERIALS

Gerry P. Mack, Jackson Heights, N. Y., assignor to Advance Solvents & Chemical Corporation, New York, N. Y., a corporation of New York No Drawing. Application March 29, 1941,
Serial No. 385,868

1 Claim. (Cl. 260—17)

The present invention relates to aqueous polyisobutylene emulsions, and more particularly to the employment of the same for finishing and dressing fibrous materials.

I have disclosed in my co-pending application Serial No. 332,699, filed May 1, 1940, of which the present application is a continuation in part, various methods of producing aqueous emulsions of polyisobutylene. It is noted in that application that polyisobutylene is sold on the market under the trade-name "Vistanex" in various grades, ranging from a viscous, sticky plastic to an elastic, resilient solid. One of these grades is termed "Vistanex medium." I have found, as pointed out in said application that aqueous emulsions of such polymers having certain resins incorporated therein may be employed to form films which are quite flexible and which, accordingly, are suitable for making leather dressings. Among the examples of emulsions which are disclosed in said application, are those which contain a resin of a certain type and also a wax, such as paraffin wax, the resin being compatible with both the polyisobutylene and the wax. These emulsions are particularly suited for finishing and dressing fibrous materials of all kinds, such as paper, leather and the like. Compositions comprising these emulsions and dressings and finishes resulting from the use thereof, are the purposes and objects of the present invention.

In my aforesaid application I have described the manufacture of the emulsions by milling the polymer with a conjunctive agent and dispersing the mixture in water by means of an emulsifying and dispersing agent, by melting the polymer with a solid solvent therefor and dispersing the melt in warm water, and by dissolving the polymer and an addition agent, such as a hydrocarbon wax and resins compatible with the polymer and wax, in a hydrocarbon solvent and dispersing the solution in water by means of an emulsifying agent. Any of these methods may be employed in producing the emulsions of the present application, although since the resins under contemplation have a melting point in excess of 100° C., a solvent should be added to reduce the melting point below 100° C., when employing either of the first two mentioned procedures.

The resins which have been found particularly suitable for my purposes are those sold under the trade names "Nevillite" which is a hydrogenated coumarone-indene resin, and "Nypene" or "Piccolyte" which are pure hydrocarbon thermoplastic terpene polymers composed essentially of beta-pinene.

The composition may contain a wax such as paraffin wax, but it is to be understood that such wax is not essential. Any of the aforementioned resins is compatible both with the polymer and the wax, and no difficulties are, therefore, experienced in providing the compositions with a wax.

The ratio of polymer to resin may vary over a fairly broad range provided that a considerable excess of resin is employed. Good results have been obtained with a ratio of between 136 and 306 parts by weight of resin to each 100 parts by weight of polymer.

Any of the known emulsifying or dispersing agents may be used in producing the emulsions. For instance, there may be employed for this purpose fatty acid soaps, alcohol sulfonates and sulfates, alkylated aromatic sulfonic acids, acylated amino carboxylic and sulfonic acids, saponins, alginates and the like. The solvent which is employed can be naphtha, benzol, toluol, carbontetrachloride or chlorbenzene. Various solvents may be used but I prefer hydrocarbon solvents, such as are obtained in the distillation of petroleum. Other solids, particularly resinous bodies may be employed, if they are compatible with the polymer, the aforesaid resin and waxes, and in this connection reference may be made to coal tar naphtha polymers, such as those sold under the trade name "Nevinol."

The emulsions may be applied to the fibrous material, such as paper or leather, according to the usual methods. The emulsions produce films which either are very glossy or can be buffed to a high gloss. These films are exceedingly flexible so that they will not crack on bending of the leather. In this respect, the coating emulsions, according to my invention, are superior to known dressing agents, such as for instance nitrocellulose lacquers and the like.

The following examples will serve to illustrate the invention, but it is to be understood that the examples are explanatory and not limitative. The parts given are by weight.

Example 1

| | Parts |
|---|---|
| Hydrogenated coumarone indene resin (Nevillite) | 150 |
| 135° F. paraffin wax | 30 |
| Stearic acid | 9 |
| Polyisobutylene (polymer of mol. wt. of 12,000) | 60 |
| Polyisobutylene (polymer of mol. wt. of 75,000) dissolved in toluol to a 25% solution | 200 |
| Toluol | 80 |
| Morpholine | 5 |
| Water | 175 |

The resin, wax and stearic acid are melted in a steam jacketed kettle and brought to a temperature of 100 to 150° C. The polyisobutylene polymer of 12,000 mol. weight is then added and the whole is stirred until the solution is homogenous. The temperature is then dropped to about 70° C. and 80 parts of toluol are added with stirring. 200 parts of a 25% solution of the higher polymer of isobutylene, having a mol. weight of 75,000, are stirred in.

While vigorously stirring the above solution, a solution of 5 parts of morpholine in 25 parts of water previously heated to 70° C. is gradually worked into the solution of resin, wax, etc. When the morpholine solution has been completely worked in, warm water (70° C.) is gradually added until a smooth emulsion is obtained. Total water added was 175 parts.

This emulsion, when applied to leather or paper, will dry down to a very flexible, waterproof and glossy coating, very suitable for leather or paper surfaces.

Example 2

To 100 parts of emulsion of Example 1, there are added 100 parts of a pigment paste prepared as follows:

|  | Parts |
|---|---|
| Iron oxide | 50 |
| Clay | 100 |
| Dispersing agent (such as the sodium salt of polymerized polyaryl sulfonic acids) | 3 |
| Water | 100 |

The dispersing agent is dissolved in water, the iron oxide and clay are stirred in, and the whole ground in a colloid mill until a smooth paste is obtained.

When the emulsion is pigmented as exemplified above and coated onto paper, the resulting coating is flexible, waterproof, but has a dull finish, which is desired in many cases.

The finish can be buffed or polished to a high gloss by rubbing with a cloth, glass rod or polishing roll.

Example 3

The procedure is the same as in Example 1, except that the resin used is one of the polymerized beta-pinene resins sold under the trade names of "Nypene" or "Piccolyte."

Example 4

An aqueous emulsion of polyisobutylene is obtained according to the method of my co-pending application Serial No. 332,699 by kneading 600 parts by weight of a polymer, having a mol. weight of 93,000, with 65 parts by weight of pale crepe rubber (40 minute break down). There are then added 12 parts by weight of stearic acid and one part by weight of sodium hydroxide and the mass is mixed to insure thorough dispersion. At this point the temperature is about 104–113° F. and the mass is cooled to about 90° F. before further processing. After cooling the mass, an aqueous solution of 20 parts by weight of sodium lauryl sulfate is added at intervals in small successive portions until the mass becomes highly plastic. Then a peptizing agent, such as sodium mineral oil sulfonate (the product made in refining crude petroleum oil by a treatment with sulfuric acid and a subsequent neutralization with caustic soda, is added in an amount of about 12 parts by weight, whereupon the mass becomes pasty and shortly thereafter completely inverts. In all, about 600 parts of water are employed, and the resulting emulsion has about 54% solids of the following composition:

| Material | Parts by weight | Per cent by weight of all solids |
|---|---|---|
| Polyisobutylene | 600.0 | 84.56 |
| Crepe rubber | 65.0 | 9.16 |
| Sodium stearate | 7.7 | 1.08 |
| Stearic acid | 4.8 | 0.68 |
| Sodium lauryl sulfate | 20.0 | 2.82 |
| Sodium mineral oil sulfonate | 12.0 | 1.70 |
|  | 709.5 | 100.00 |

The emulsion contains 45.8% by weight of polyisobutylene.

100 parts of a 70% solution of a hydrogenated coumarone indene resin in toluol was vigorously stirred, and to it was added 3 grams of oleic acid. To this was then added 3 parts of morpholine, dissolved in 10 parts of water. Agitation was continued and water was gradually added until a total of 100 parts had been added. A milky stable emulsion was obtained. The emulsion so prepared was then blended with 50 parts of the polyisobutylene emulsion while stirring.

Such a blend, when coated on paper or leather, gave a very flexible, water-resistant and glossy film. A blend of emulsions as described above is particularly useful for finishing off the type of leather known as "split leather," as it gives a very flexible and glossy finish to the "split leather."

Example 5

An aqueous emulsion of polyisobutylene was prepared, having the following composition:

|  | Parts |
|---|---|
| Polyisobutylene polymer (50,000 mol. wt.) | 665 |
| Casein | 54 |
| Borax | 8 |
| Water | 650 |

The polymer is charged into an internal type of mixer, such as the Banbury or Werner-Pfleiderer type. The polyisobutylene is then kneaded for about 5 minutes, after which the borax is added, and this mixture worked for another 10 minutes. At the end of this time, there is added in 10 gram portions a casein suspension, having a ratio of 1 part of casein to 9 parts of water, which has been previously mixed in warm water and allowed to stand for about half an hour. This casein suspension is worked in as rapidly as the mass will absorb it. The first few additions are spaced about 5 minutes apart, which is about the time required for the mass to unite, for after each addition there is a "crumbling effect." After that, the polymer mass readily absorbs the casein dispersion, and when all of it has been absorbed, there is an inversion of phases, and the polyisobutylene is now in the dispersed phase and water is the continuous phase. This dispersion can be diluted then with further additions of water. It is preferable to maintain the water phase at about 50%, as greater dilution than this causes excessive creaming. A suitable preservative for casein, such as sodium pentachlorphenate, may be added if desired. The emulsion contains 48.3% by weight of polyisobutylene.

200 parts of the above emulsion are vigorously stirred, and then is slowly added 250 parts of a 70% solution of a hydrogenated coumarone indene resin in a low boiling naphtha solvent. This solution is readily emulsified by the polyisobutylene emulsion, and the resulting emulsion is passed through a colloid mill to give a very stable pasty emulsion, which can be diluted with water.

*Example 6*

67 parts of a hydrogenated coumarone indene resin and 33 parts of a polyisobutylene polymer, having a molecular weight of 60,000 were dissolved in 100 parts of toluol. While vigorously agitating this mixture, there were added 15 parts of a soap gel, made by heating together 5 parts stearic acid, 5 parts morpholine and 5 parts of toluol. 100 parts of water were slowly added to this mixture, followed by 50 parts of a 5% water solution of sodium lauryl alcohol sulphate and 50 parts of a 3% water solution of methyl cellulose. The resulting emulsion is particularly useful for finishing very porous leather. It was found that the introduction of the methyl cellulose blocks the pores of the leather and, thus, prevents the penetration of the aqueous emulsion into said pores with a resulting economy in finishing of the leather, where only a surface coat is desired. The methyl cellulose may be present in an amount of from ½ to 10% of the total solids content.

*Example 7*

The procedure is the same as in Example 6, but to the resulting emulsion there is added 30 parts of a 15% carnauba wax emulsion.

*Example 8*

The procedure is the same as in Example 6, but to the resulting emulsion there is added a pigment dispersion made by dispersing 15 parts of titanium dioxide in a 50 parts of a 2% methyl cellulose solution.

Various modifications of the invention will occur to those skilled in the art and I, therefore, do not intend to be limited by the patent granted, except as required by the appended claim.

What I claim is:

A composition for finishing and dressing fibrous materials, comprising an aqueous emulsion containing about 100 parts by weight of a tough, dry, elastic and rubbery polyisobutylene between 136 and 306 parts by weight of a cyclic hydrocarbon resin selected from the group consisting of the resinous polymers of beta-pinene and the hydrogenated coumarone indene resins, and methyl cellulose in an amount of ½ to 10% of the total solids content of the emulsion.

GERRY P. MACK.